United States Patent [19]

Strand

[11] Patent Number: 4,886,208
[45] Date of Patent: Dec. 12, 1989

[54] LIQUID HERBICIDE ATTACHMENT FOR GRANULAR APPLICATOR

[75] Inventor: Glen L. Strand, Murdock, Minn.

[73] Assignee: Tyler Limited Partnership, Benson, Minn.

[21] Appl. No.: 213,958

[22] Filed: Jul. 1, 1988

[51] Int. Cl.[4] .............................................. A01C 15/04

[52] U.S. Cl. ...................................... 239/77; 239/655; 239/662

[58] Field of Search ................. 239/77, 167, 170, 172, 239/654, 655, 662, 663

[56] References Cited

U.S. PATENT DOCUMENTS

| | | | |
|---|---|---|---|
| 1,785,932 | 12/1930 | Brown et al. | 239/77 |
| 2,356,950 | 8/1944 | Root | 239/77 |
| 2,583,560 | 1/1952 | Gaddis | 239/77 |
| 2,608,792 | 9/1952 | Chater | 239/77 |
| 2,850,836 | 9/1958 | Copeland, Jr | 43/147 |
| 3,401,890 | 9/1968 | Middlesworth | 239/670 |
| 3,730,431 | 5/1973 | Williams | 239/1 |
| 3,926,371 | 12/1975 | Harrell et al. | 239/146 |
| 4,185,782 | 1/1980 | Belrose | 239/663 |
| 4,480,794 | 11/1984 | Fuss et al. | 239/654 |
| 4,569,486 | 2/1986 | Balmer | 239/655 |
| 4,588,127 | 5/1986 | Ehrat | 239/662 |
| 4,700,895 | 10/1987 | Takata | 239/664 |
| 4,767,062 | 8/1988 | Fletcher | 239/655 |

OTHER PUBLICATIONS

Brochure date—Feb. 1986—Model 300 LP and 400 LP.
Brochure date—Apr. 1987—Model 2004.
Brochure date—Feb. 1986—Model 3004.
Brochure date—Feb. 1986—Model 5004.
Brochure date—Jan. 1986—Model 6003.

*Primary Examiner*—Andres Kashnikow
*Assistant Examiner*—Karen B. Merritt
*Attorney, Agent, or Firm*—Kinney & Lange

[57] ABSTRACT

A liquid pesticide attachment for a granular material applicator for agricultural use which provides for injecting a metered amount of the liquid pesticide into an air stream containing a metered amount of granular material to be distributed, and having the material travel together to be deposited onto the ground. With any air distribution system for inorganic particulate material, a mixture of air and the particulate material is carried in a conduit, and a metering device is attached to provide for adding of the liquid material into the air-particulate material as it is being conveyed.

12 Claims, 3 Drawing Sheets

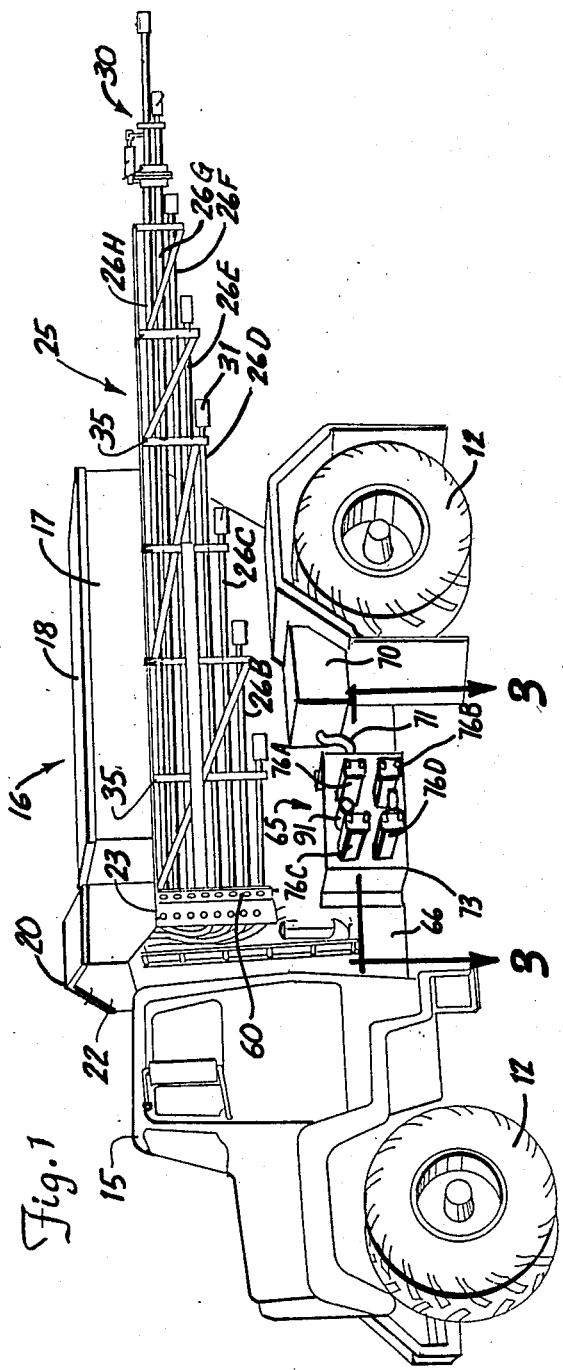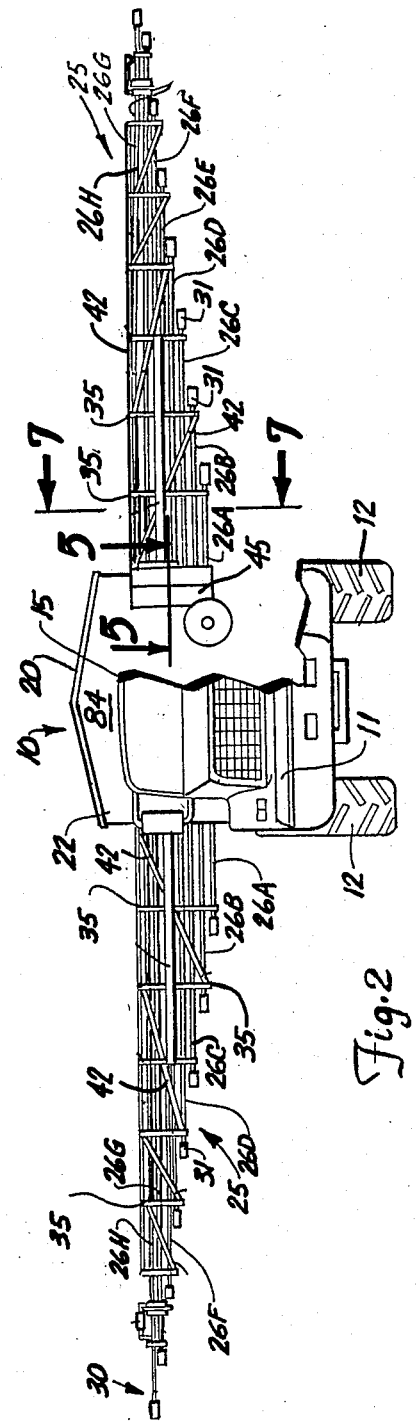

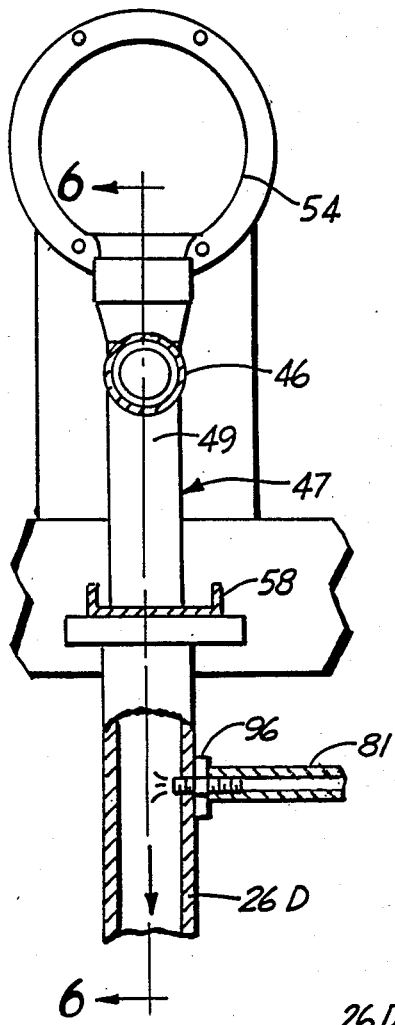
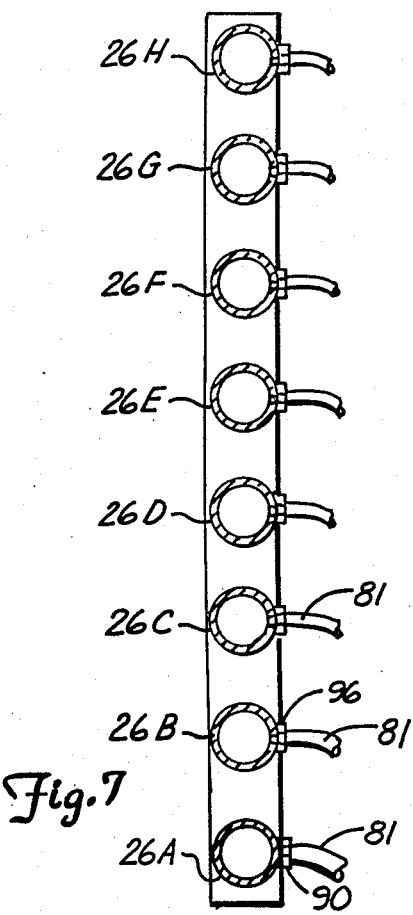
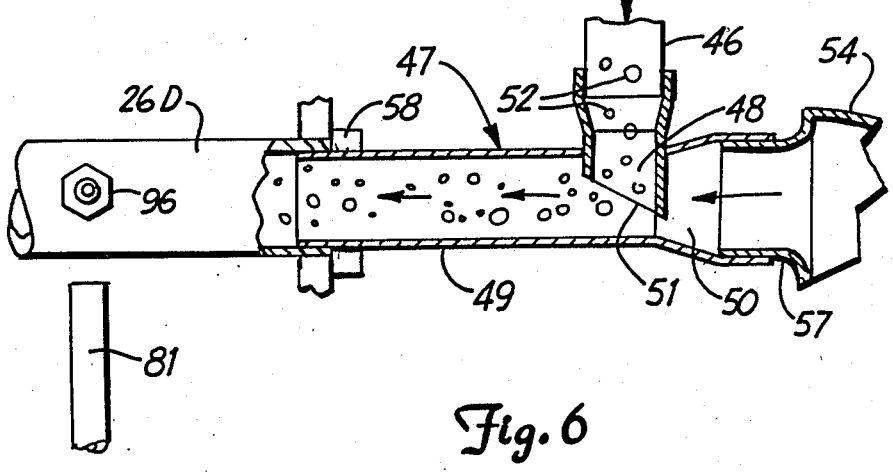
Fig. 5
Fig. 7
Fig. 6

LIQUID HERBICIDE ATTACHMENT FOR GRANULAR APPLICATOR

BACKGROUND OF THE INVENTION

1. Field of the Invention

The present invention relates to a liquid pesticide attachment for an air conveying or fluidizing applicator for particulate material.

2. Description of the Prior Art

There presently are devices that will distribute either liquid or dry materials, such as herbicides or pesticides onto the ground. For example, U.S. Pat. No. 4,185,782 shows such a system.

Other systems mix pesticides with water while the material is being sprayed, as shown in U.S. Pat. No. 3,926,371. Separate sprayers for applying pesticides have been advanced, and such a device is shown in U.S. Pat. No. 3,730,431. A lime spreader and sprayer is shown in U.S. Pat. No. 3,401,890, and while the two products are simultaneously applied, the application is not done by injecting known amounts of the herbicide into a granular material as it is being conveyed for distribution.

U.S. Pat. No. 2,850,836 shows two different sets of tanks for carrying two different types of materials, but not for simultaneous application. In addition, applicators are shown generally in U.S. Pat. Nos. 4,480,794 and 4,700,895.

Air conveying of seed and fertilizer is also well known, and a typical spreader is shown in the copending U.S. patent application Ser. No. 07/104,784, of Glen L. Strand filed on Oct. 5, 1987, now U.S. Pat. No. 4,793,742 and entitled "TRUCK MOUNTED FERTILIZER APPLICATOR USING FLUID CONVEYING". That application shows a device that has been in public use for more than a year before the date of filing this application, and describes in detail an air conveying distributor which is shown in this application and with which the improvement of the present invention is used.

SUMMARY OF THE INVENTION

The present invention relates to an attachment for a granular applicator that will apply liquid pesticides with the granular material by injecting the liquid, in metered amounts, into individual conduits that are used for conveying the granular material, such as inorganic fertilizer or other materials. The injectors utilized are essentially orifices that carry a metered amount of the liquid pesticide and deposit it in the stream of particles and air that are moving in a conduit.

The attachment injects (dribbles, pours or sprays) a liquid pesticide that has been premetered by a pump. As shown, each separate conduit carrying the air-particulate material mixture has a corresponding liquid pesticide metering pump. In the form shown, these pumps are peristaltic pumps that will meter a set amount of liquid material from a tank and through an orifice into the associated conduit in a desired location. The liquid material then intermixes with the air and particulate material, coating the particulate material as it is being carried in the conduit, and both the particulate material and the pesticide are discharged at the discharge end of the conduit. Thus, both the particulate material, which may be a fertilizer for example, and the pesticide, are applied simultaneously, conveniently, and without any need for two passes across a field.

The present attachment for air conveying devices is low cost and easy to use, and the volume can easily be controlled to meet existing conditions. The injection of the liquid pesticide is made at a location to minimize the length of hoses from the metering pump to the conduit, and the liquid injection nozzles or orifices are also positioned so that they are not in the mixing chamber where the particulate material and air are being mixed. In this way, when the liquid is injected into the moving mixture of air and particulate material, the problems of plugging, uneven application and the like are not encountered.

For purposes of definition, the term "pesticide" is a general term that denotes both a herbicide and an insecticide. Either herbicides or insecticides can be applied utilizing the present invention.

BRIEF DESCRIPTION OF THE DRAWINGS

FIG. 1 is a part perspective view of a spreader having a fluid based distribution system with which the present invention may by used;

FIG. 2 is a front elevational view of the device of FIG. 1 showing distribution booms in a working position and with parts in section and parts broken away;

FIG. 5 is a sectional view taken as on line 5—5 in FIG. 2 showing a detail of the inlet end of the air conveying conduits;

FIG. 6 is a sectional view taken as on line 6—6 in FIG. 5; and

FIG. 7 is a sectional view taken as on line 7—7 in FIG. 2.

DETAILED DESCRIPTION OF THE PREFERRED EMBODIMENTS

Figure 3:
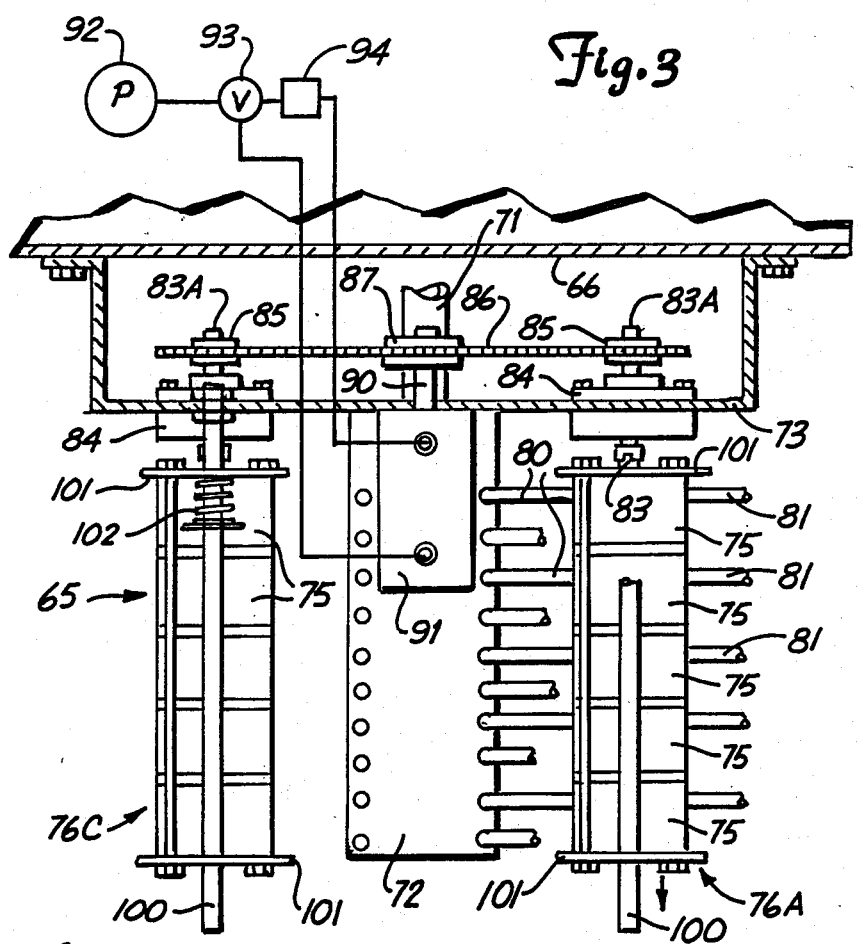
FIG. 3 is a top plan view of a portion of the device of the present invention taken on line 3—3 in FIG. 1 and schematically showing metering pumps and drive for liquid pesticide.
Figure 4:
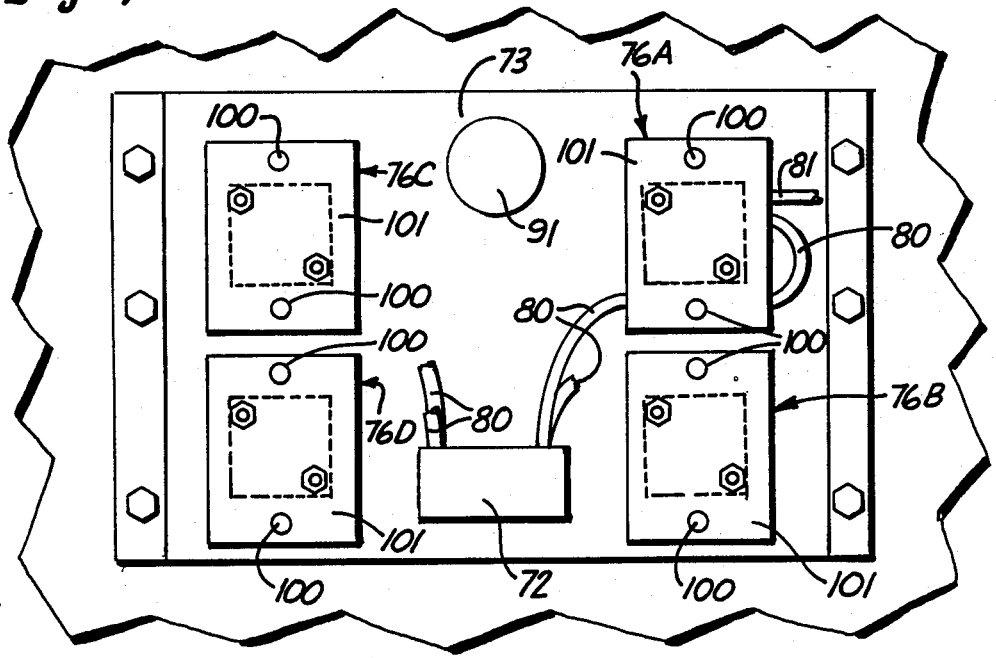
FIG. 4 is a side view of the pump and drive of FIG. 3.

The device of the present invention is used for injecting liquid herbicide in air conveyed particulate material for agricultural use. The air conveyed material is provided with a distribution system shown in U.S. patent application Ser. No. 07/104,784, filed Oct. 5, 1957. The first part of the present description deals generally with construction shown in more detail in that application.

A truck indicated generally at 10 has a frame 11, and large floatation type wheels and tires 12 that are mounted on the front and rear axles. The truck can be rearwheel drive or fourwheel drive if desired, and includes an operator cab 15, and a particulate material distribution system indicated generally at 16. The distribution system includes a particulate material storage tank 17 that mounts onto the frame 11 of the truck, overlying the rear wheels, and this storage tank can have covers 18 provided in the normal manner.

A metering and air distribution system indicated generally at 20 is positioned ahead of the storage container 17, immediately to the rear of the cab 15 and thus is approximately mid-ship or in the range of halfway between the front and rear wheels 12.

The air distribution system includes a material metering hopper 22, and boom support frame assemblies indicated generally at 23 are mounted on opposite sides of the metering hopper and adequately braced back to the structural components of the distribution system 16. The boom support frames each mount hinged boom assemblies 25, that are pivoted about upright axes and are foldable from a position shown in FIG. 1 where the booms extend rearwardly back along the sides of the truck and container 17, to position where the boom assemblies 25 extend laterally out from the truck 10 to cover a substantial width for travel down the field as shown in FIG. 2.

As shown in FIGS. 1 and 2, the boom assemblies are made up of different length tubes 26A-26H. The lowermost tube shown at 26A is substantially shorter than the upper tube 26H. The intermediate tubes are of graduated length.

The outer or discharge end of each of the tubes or conduits 26 has a deflector shown generally at 31 thereon which is used for directing granular material discharged from the conduit in a desired manner.

The boom arrangement and deflectors 31 give a substantially uniform distribution of granular material across the ground over which the truck 10 is traveling. Separate distribution conduits or tubes can be provided to cover the ground behind the truck.

The boom assemblies 25 on each side of the truck are provided with upright supports 35 and braces 42 to properly support the booms.

Material from container 17 is moved into the metering hopper 22 and then is metered in a metering section 45, which can be of any desired design. The metering of the particulate material can be carried out as desired. The metered materials are divided into individual portions, one portion for each of the tubes of the boom. The metered material is dropped through individual conduits or tubes indicated at 46 in FIG. 6, and into an air-particulate material mixing housing indicated generally at 47. The mixing housings 47 each include a nozzle member 48 that projects into a tube 49 which has a Venturi section 50. The nozzle 48 has a tapered or cut end 51 so that the particulate material 52 dropping into the mixing housing will drop into the interior of the tube 49 at the output end of the Venturi 50.

Suitable air is provided from a blower 53 (see FIG. 2) that provides air to a plenum chamber 54. The plenum chamber has individual outlets as shown at 57 in FIG. 6, leading to each of the Ventures 50. The air flowing in direction as indicated by the arrows in FIG. 6 intermixes the particulate material with this air, and expels an air-particulate material conveying stream through the tube 49. The tube 49 is supported on a suitable bracket (there are individual tubes 49 for each of the boom tubes) indicated generally at 58, and the outer end of the tube 49 telescopes into an end portion of one of the boom tubes. A boom tube 26D is shown in FIG. 6. The ends of the boom tubes 26 and the entire boom assembly are supported on a pivoting bracket 60, that is shown in FIG. 1, to permit folding the boom assemblies backwardly and also pivoting it to its working position.

FIG. 5 shows a top view of the mixing housing 47, and tube 49, as well as a top view of the plenum chamber 54.

The just described metering and air mixing devices is a typical showing, and any standard air conveying system that is presently available and is shown in the prior art can be utilized with the present invention. The blower 53 can be powered from a suitable power source.

The present invention relates to an attachment to inject liquid pesticides into the boom tubes 26A-26H and includes a metering pump assembly 65 that is mounted onto a frame member 66 of the truck and which provides a metered amount of pesticide into each of the individual boom tubes 26A-26H on each side of the truck, as well as any tubes that extend rearwardly and cover the ground behind the truck. The liquid herbicide is carried in a storage tank indicated at 70 that can be mounted onto the truck frame in any desired manner, and as shown, an outlet conduit 71 is used for providing the liquid herbicide to the metering pump assembly 65. The conduit 71 leads to a manifold 72 that is mounted onto a main mounting bracket 73 that is in turn bolted to the truck. In FIG. 3, a top view of the arrangement is shown.

A plurality of individual metering pumps 75 are mounted into clusters or banks of pumps, and as shown there are four such clusters or banks of pumps indicated at 76. Each of the pumps is identical, and preferably are peristaltic type pumps of conventional design which are made to be ganged together so that each of the individual pumps 75 can, for each of the banks of pumps 76A-76D, be driven from a common drive shaft. The standard pump head sold under the trademark MASTERFLEX, manufactured by the Cole-Parmer Instrument Company, and distributed by Barnant Company of Barrington, Ill., has been found to be satisfactory. Thus, the pumps are shown only schematically, but they comprise metering pumps that utilize a flexible plastic tube and a roller that rolls along the tube to provide a pumping action. Each of the pumps 75 has an intake tube portion 80, and an outlet tube portion 81 that leads to one of the individual boom tubes 26A-26H. The pumps have an input drive shaft 83 that has a drive tang that slips into a slot in a shaft 83A. The shaft 83A is mounted in a suitable bearing support 84 on bracket 73. A sprocket 85 is used on each of the shafts 83A, and these sprockets 85 are driven with chain 86 from a drive sprocket 87. The drive sprocket 87 is mounted onto the output shaft 90 of a hydraulic motor 91 that also is mounted onto the bracket 73. The bracket 73 and supported pumps are removable from the truck merely by removing the bracket 73, and disconnecting the input conduit 71. Of course, the supply tank for the pesticide can have suitable shut-off valves and inlet openings which are not shown. The hydraulic motor 91 can be driven from a suitable pump 92 through a control valve 93 operated by the operator.

The hydraulic motor 91 can be selected to run at a desired speed using a flow control valve 94 so that the liquid pesticide supplied from the manifold 72, and taken in through the intake tubes 80 and discharged through the outlet tubes 81 will be the desired metered amount commensurate with the amount of particulate material that is being conveyed.

Each of the individual tubes 81, as stated, leads to a separate distribution boom tube or conduit, and is connected, as can perhaps best be seen in FIGS. 5, 6 and 7, to one of the individual boom tubes through an orifice hose barb or connector 96. Each individual hose barb or connector 96 is fixed (welded) on the side wall of the respective boom tube and has an opening that is aligned with an opening in the tube of conduit. The axis of the orifice opening in the connector 96 is perpendicular to the longitudinal axis of the conduit. As shown, the connectors 96 are positioned on the rear sides of the boom tubes, so that the connectors and pesticide carrying tubes are essentially out of the way. Each of the hose barbs or connectors 96 is substantially on the same plane so that the lengths of the tubes 81 are substantially uniform to insure uniform start-up feed of the metered material, and also to minimize the length of the tubes 81 that is required. However, the connectors 96 are to the outside (downstream) of the mixing housing 74, so that material is not injected in the mixing housing. The outward connection of the main boom tubes 26 insures that the particles and air stream are well mixed, and that the liquid material that will be injected or dripping into the boom tube will be picked up by the air and moving particles easily without causing any plugging.

In FIG. 7, it can be seen that the individual tubes 81 all connect to boom tubes, and that the liquid material then can be injected in droplets or if desired, under a sufficient pressure to form a spray.

However, the liquid material generally can dribble in, in a flowing, nonatomized manner and will still be carried by sufficient particles to effect an adequate application.

The metering pumps used are merely exemplary of the type of pump that can be used for injecting the materials. The materials have to be conveyed with a sufficient pressure to reach the individual boom tubes, in a desired volume, but the material does not have to be under sufficient pressure to spray into the tubes. The volume of the liquid pesticide can be controlled to be adjusted to the rate of application of the particulate or granular material through the air conveying system, and because of the air suspension the liquid material is adequately mixed with the particles for proper operation. It should be noted that the banks or gangs of pumps are mounted as a unit on support rods 100 that are attached to bracket 73. End plates 101 of each bank or gang of pump is slidably mounted on the rods and urged toward the bracket 73 by springs 102 to keep the drive engaged. Each bank of pumps can be individually disengaged by sliding them out along the support rods against a spring force and locking them in position to disengage the drive lug between the drive shaft 83A that is mounted in the housing 84 and the pump shaft 83. The drive coupling is a tongue and groove arrangement, so that moving the pump bank 76A-76D outwardly or away from the bracket 73 will cause disengagement. Thus, one or more banks of pumps can be disengaged quickly for suiting the operator's purposes.

More than one chemical tank can be utilized on the truck, and the tank that is shown is merely for illustrative purposes.

If desired, the speed of the hydraulic motor 91 can be controlled by a commercially available electrohydraulic servosystem so that the pump volume output can be programmed by preselected parameters, such as pints of pesticide to be applied per acre, or the travel speed of the vehicle. Suitable sensors are provided for obtaining the desired parameters.

Although the present invention has been described with reference to preferred embodiments, workers skilled in the art will recognize that changes may be made in form and detail without departing from the spirit and scope of the invention.

What is claimed is:

1. For use in combination with an air conveying system for conveying particulate materials through conduits for distribution onto the surface of the ground, the improvement comprising a liquid pesticide injector attachment, said pesticide injector attachment including means for providing a metered amount of pesticide, and means for injecting the metered amount of pesticide in a flowable, nonatomized liquid form as it is introduced into a conduit carrying air entrained particulate material past the means for injecting, to thereby have the liquid pesticide material carried by the particles and air stream to the outlet of the conduit.

2. The apparatus as specified in claim 1 wherein said means for injecting comprises a fitting mounted on the side of the conduit, the fitting having an orifice opening into the conduit, with an axis substantially perpendicular to the longitudinal axis of the conduit.

3. The apparatus of claim 1 wherein said means for providing a metered amount of liquid pesticide comprises an individual metering pump to provide the liquid pesticide to the respective conduit in the form of droplets entering the conduit.

4. The apparatus as specified in claim 1 wherein there are a plurality of conduits extending laterally from a moving vehicle, and wherein the means for providing comprises an individual metering pump for each of said conduits on the vehicle.

5. The apparatus as specified in claim 4 wherein said metering pumps comprise peristaltic pumps having input lines connected to a common manifold, and individual output lines connected to a separate one of the conduits conveying particulate material, and a liquid pesticide tank mounted on said vehicle to provide liquid pesticide to the manifold.

6. The apparatus as specified in claim 4 wherein there are a substantial plurality of conduits mounted on the vehicle, and a separate attachment bracket, a plurality of individual metering pumps mounted on the bracket, and a hydraulic motor drive for said plurality of pumps mounted on the same bracket, said bracket being connectable to a vehicle frame as a unit for mounting the attachment.

7. The apparatus as specified in claim 1 wherein said air conveying system includes a mixing housing having a Venturi section, said mixing housing being connected onto a smooth-walled tubular conduit, and wherein the means for introducing the liquid pesticide is positioned on the smooth walled tubular conduit to the downstream side of and adjacent the mixing housing to provide liquid droplets of the pesticide to the tubular conduit.

8. The apparatus as specified in claim 6 wherein said conduits are positioned vertically one above the other, and wherein the means for injecting pesticide into the conduits is positioned on a substantially common vertical plane.

9. for use in a particular material spreader mounted onto a vehicle and movable over the surface of the ground for spreading particulate material, said spreader comprising a plurality of boom tubes, and means for providing particulate material entrained in an air stream and conveyed through each of the boom tubes from an inlet end to an outlet end, said boom tubes being mounted into a boom assembly the improvement comprising an injector for injecting liquid pesticide into the air entrained particulate material stream in each of the conduits and including a plurality of metering pumps, one for each of the boom tubes mounted on said vehicle;

means for driving said metering pumps to provide a metered amount of liquid pesticide at an outlet of the pump;

a separate flow tube connected to the outlet of each pump; and a separate connector member mounted on each of said boom tubes on a lateral side thereof said connector members having passageways therethrough forming orifices positioned on the interior of the conduits, each of the separate flow tubes connecting the outlet of a separate pump to one of the boom tubes to convey a metered amount of the liquid pesticide into the interior of the respective boom tubes for injection into the air entrained particulate material being carried in that conduit.

10. A liquid pesticide injector attachment for an air conveying system which conveys particles of material to a plurality of individual conduits, each having an inlet and an outlet end, and wherein the particles of material are discharged at the outlet end for distribution under the surface of the ground, said pesticide injector attachment including means for metering a selected amount of liquid pesticide into a plurality of liquid carrying lines, an orifice fitting in each conduit between the inlets and outlets thereof, each orifice fitting being connected to receive liquid pesticide from one of the liquid carrying lines, the metered amount of pesticide being introduced into the conduit as a flowing, nonatomized liquid to contact the particles conveyed past the orifice fitting to thereby have the liquid pesticide material coat the particles as the particles are carried in the conduit to the outlet end of the conduit for discharge.

11. The attachment of claim 10 wherein the orifice fitting has an orifice axis, said orifice axis being substantially perpendicular to the direction of travel of the particles of material in the conduit, said liquid material having a dribbling flow into the conduit, and being carried by the particles moving past the orifice fitting.

12. The attachment of claim 10 wherein the air conveying system with which the attachment is used is a particulate fertilizer system having a plurality of laterally extending conduits of different lengths to provide for distribution of the particulate fertilizer material over the ground, said fertilizer particles carrying the pesticide to the ground.

* * * * *

UNITED STATES PATENT AND TRADEMARK OFFICE
CERTIFICATE OF CORRECTION

PATENT NO. : 4,886,208
DATED : December 12, 1989
INVENTOR(S) : Glen L. Strand

It is certified that error appears in the above-identified patent and that said Letters Patent is hereby corrected as shown below:

Column 6, line 18, delete "moving" and insert --movable--.

Column 6, line 50, delete "9.   for", and insert --9. For".

Column 6, line 50, delete "particular" and insert --particulate--.

Signed and Sealed this

Thirteenth Day of November, 1990

Attest:

HARRY F. MANBECK, JR.

*Attesting Officer*            *Commissioner of Patents and Trademarks*